United States Patent [19]
Yamamoto et al.

[11] Patent Number: 5,539,643
[45] Date of Patent: Jul. 23, 1996

[54] TRACTION CONTROL SYSTEM FOR VEHICLE

[75] Inventors: Osamu Yamamoto; Hironobu Kiryu; Takashi Nishihara; Shuji Shiraishi, all of Wako, Japan

[73] Assignee: Honda Giken Kogyo Kabushiki Kaisha, Tokyo, Japan

[21] Appl. No.: 12,126

[22] Filed: Feb. 1, 1993

[30] Foreign Application Priority Data

Feb. 4, 1992 [JP] Japan .................................. 4-019182

[51] Int. Cl.⁶ .................................................. B60T 8/32
[52] U.S. Cl. ............................. 364/426.03; 364/426.01; 180/197
[58] Field of Search ......................... 364/424.05, 424.01, 364/426.03, 426.01, 426.04, 431.05, 426.02; 180/197

[56] References Cited

U.S. PATENT DOCUMENTS

| | | | |
|---|---|---|---|
| 4,873,638 | 10/1989 | Shiraishi et al. | 364/426.01 |
| 4,953,093 | 8/1990 | Etoh | 364/426.04 |
| 5,019,989 | 5/1991 | Ueda et al. | 364/431.05 |
| 5,137,105 | 8/1992 | Suzuki et al. | 180/197 |
| 5,172,319 | 12/1992 | Shiraishi et al. | 364/426.03 |
| 5,195,037 | 5/1993 | Tezuka | 364/426.02 |
| 5,222,570 | 6/1993 | Kawamura et al. | 180/197 |
| 5,243,526 | 9/1993 | Ito et al. | 364/426.02 |
| 5,262,950 | 11/1993 | Nakayama | 364/424.05 |

FOREIGN PATENT DOCUMENTS

| | | |
|---|---|---|
| 0229249 | 7/1987 | European Pat. Off. |
| 3728574C1 | 11/1988 | Germany. |
| 3741248C1 | 6/1989 | Germany. |

Primary Examiner—Kevin J. Teska
Assistant Examiner—Russell W. Frejd
Attorney, Agent, or Firm—Armstrong, Westerman, Hattori, McLeland & Naughton

[57] ABSTRACT

A traction control system for a vehicle includes a calculator for calculating a speed of a driven wheel of the vehicle, a calculator for calculating a vehicle speed and a calculator for calculating a slip rate of the driven wheel on the basis of the driven wheel speed and the vehicle speed, such that the feed-back control of a throttle valve is carried out to reduce the output torque from an engine to inhibit the excessive slipping of the driven wheel, when the slip rate exceeds a predetermined threshold value. The system further includes a calculator for calculating a total grip force of the vehicle, a calculator for calculating an initial engine required torque at the start of the feed-back control of the throttle valve on the basis of the total grip force, and a calculator for calculating an initial throttle opening degree of the throttle valve on the basis of the initial engine required torque. Thus, the excessive slipping of the driven wheels can be reduced without an abrupt change exerted to the behavior of the vehicle by setting an appropriate initial throttle opening degree.

3 Claims, 7 Drawing Sheets

FIG.5

TOTAL GRIP FORCE →

GEAR POSITION ↓

|     | TG1 | TG2 | ⋯ | ⋯ | TGj |
|-----|-----|-----|---|---|-----|
| G1  | T11 | T12 |   |   |     |
| G2  | T21 | T22 |   |   |     |
| ⋮   |     |     |   |   |     |
| ⋮   |     |     |   |   |     |
| Gi  |     |     |   |   | Tij |

5,539,643

TRACTION CONTROL SYSTEM FOR VEHICLE

BACKGROUND OF THE INVENTION

1. Field of the Invention

The field of the present invention is traction control systems for vehicles, comprising driven wheel speed calculating means for calculating a speed of a driven wheel of the vehicle, a vehicle speed calculating means for calculating a vehicle speed of the vehicle, and a slip rate calculating means for calculating a slip rate of the driven wheel on the basis of the driven wheel speed and the vehicle speed, such that the feed-back control of a throttle valve is carried out to reduce the output torque from an engine to inhibit the excessive slipping of the driven wheel, when the slip rate exceeds a predetermined threshold value.

2. Description of the Prior Art

There is such a conventionally known traction control system described, for example, in Japanese Patent Application Laid-open No.60331/86.

In the prior art traction control system, however, when the feed-back control of the throttle valve is started as the slip rate of the driven wheels exceeds the predetermined threshold value, a fixed throttle opening degree previously set as an initial throttle opening degree, or a throttle opening degree determined from a slip acceleration of the driven wheels and an engine torque is used. For this reason, the prior art traction control system is accompanied by a problem that the operational state of the vehicle is not sufficiently reflected, and at the start of the feed-back control of the throttle valve, the behaviour of the vehicle is abruptly changed to cause a sense of incompatibility to the feeling of steering.

SUMMARY OF THE INVENTION

Accordingly, it is an object of the present invention to provide an appropriate initial throttle opening degree corresponding to the operational state of the vehicle at the start of the feed-back control of the throttle valve in the traction control system.

To achieve the above object, according to a first aspect and feature of the present invention, there is provided a traction control system for a vehicle, comprising driven wheel speed calculating means for calculating a speed of a driven wheel of the vehicle, a vehicle speed calculating means for calculating a vehicle speed of the vehicle, and a slip rate calculating means for calculating a slip rate of the driven wheel on the basis of the driven wheel speed and the vehicle speed, such that the feed-back control of a throttle valve is carried out to reduce the output torque from an engine to inhibit the excessive slipping of the driven wheel, when the slip rate exceeds a predetermined threshold value, wherein the traction control system further includes a total grip force calculating means for calculating a total grip force of the vehicle, an initial engine required torque calculating means for calculating an initial engine required torque at the start of the feed-back control of the throttle valve on the basis of the total grip force, and an initial throttle opening degree calculating means for calculating an initial throttle opening degree of the throttle valve on the basis of the initial engine required torque.

With the first feature of the present invention, the initial engine required torque is calculated on the basis of the total grip force of the vehicle, i.e., an acceleration of the vehicle and therefore, the magnitude of the initial engine required torque can be controlled to a value near a torque capable of being transmitted to a road surface without generation of the excessive slipping of the driven wheels. Thus, if the feed-back control of the throttle valve is started from an initial throttle opening, degree capable of providing the initial engine required torque, the excessive slipping of the driven wheels can be reduced promptly without an abrupt change exerted to the behaviour of the vehicle.

In addition to the first feature, the present invention has second aspect and feature that the total grip force calculating means calculates the total grip force on the basis of a longitudinal acceleration of the vehicle detected by a longitudinal acceleration detecting means and a lateral acceleration of the vehicle detected by a lateral acceleration detecting means.

With the second feature of the present invention, the total grip force can be determined easily and correctly by calculating it on the basis of the longitudinal and lateral accelerations of the vehicle.

In addition to the first feature, the present invention has a third aspect and feature that the initial engine required torque calculated in the initial engine required torque calculating means includes a travel resistance torque of the vehicle calculated in a travel resistance torque calculating means.

With the third feature of the present invention, it is possible to determine a further accurate initial engine required torque corresponding to an actual travelling state of the vehicle by taking the travel resistance torque of the vehicle into consideration, when the initial engine required torque is determined.

In addition to the first feature, the present invention has a fourth aspect and feature that an engine torque calculated in an engine torque calculating means is used as the initial engine required torque, when the slip rate is smaller than the predetermined threshold value.

With the fourth feature of the present invention, when the slip rate of the driven wheels is relatively small, the initial throttle opening degree is determined by use of the engine torque of that time as the initial engine required torque and therefore, the processing can be passed to the feed-back control of the throttle valve with little influence exerted to the behaviour of the vehicle.

The above and other objects, features and advantages of the invention will become apparent from the following description of preferred embodiments, taken in conjunction with the accompanying drawings.

BRIEF DESCRIPTION OF THE DRAWINGS

FIG. 5 is a map for searching a basic initial required torque $T_{ij}$

DESCRIPTION OF THE PREFERRED EMBODIMENTS

The present invention will now be described by way of a preferred embodiment in connection with the accompanying drawings.

Figure 1:
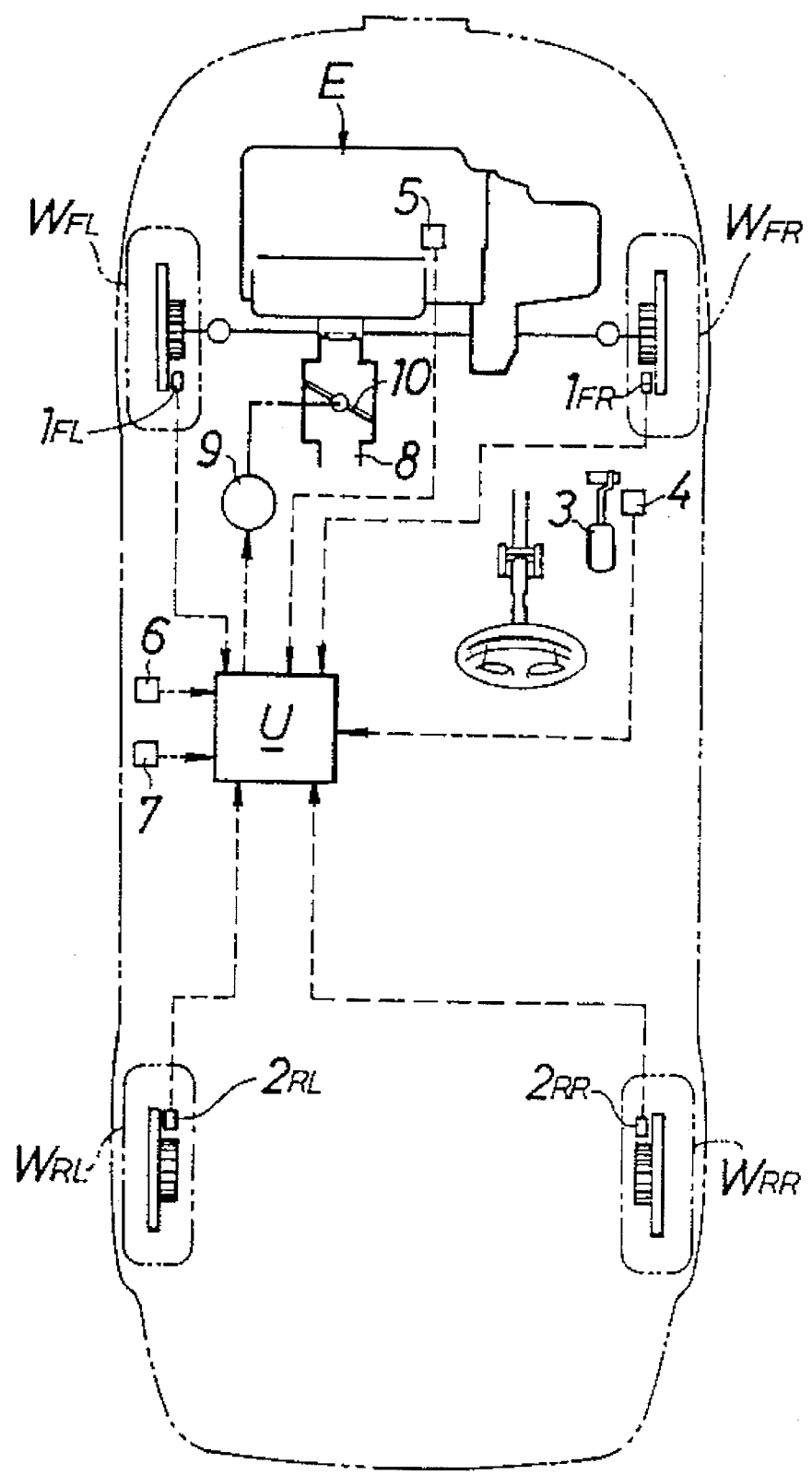
FIG. 1 is a schematic diagram of the construction of a vehicle equipped with a traction control system according to a preferred embodiment of the present invention.

Referring to FIG. 1, a vehicle to which the present invention is applied is a front wheel drive vehicle and comprises a pair of left and right driven wheels $W_{FL}$ and $W_{FR}$ driven by an engine E, and a pair of left and right follower wheels $W_{RL}$ and $W_{RR}$. A pair of left and right driven-wheel speed detecting means $1_{FL}$ and $1_{FR}$ are provided on the driven wheels $W_{FL}$ and $W_{FR}$ for detecting driven-wheel speeds $V_{FL}$ and $V_{FR}$, respectively. And a pair of left and right follower wheel speed detecting means $2_{RL}$ at and $2_{RR}$ are provided on the follower wheels $W_{RL}$ and $W_{RR}$ for detecting follower wheel speeds $V_{RL}$ and $V_{RR}$, respectively.

A throttle opening degree detecting means 4 is mounted on an accelerator pedal 3 for detecting a throttle opening degree. The engine E is provided with an engine revolution speed detecting means 5 for detecting the number Ne of revolution of engine. Provided in place on a vehicle body are a longitudinal acceleration detecting means 6 for detecting a longitudinal acceleration Gx and a lateral acceleration detecting means 7 for detecting a lateral acceleration Gy. A throttle valve 10 is mounted in an intake passage 8 of the engine E and connected to a pulse motor 9 for opening and closing. The driven-wheel speed detecting means $1_{FL}$ and $1_{FR}$, the follower wheel speed detecting means $2_{RL}$ and $2_{RR}$, the throttle opening degree detecting means 4, the engine revolution speed detecting means 5, the longitudinal acceleration detecting means 6, the lateral acceleration detecting means 7 and the pulse motor 9 are connected to an electronic control unit U which comprises a microcomputer.

Figure 2:
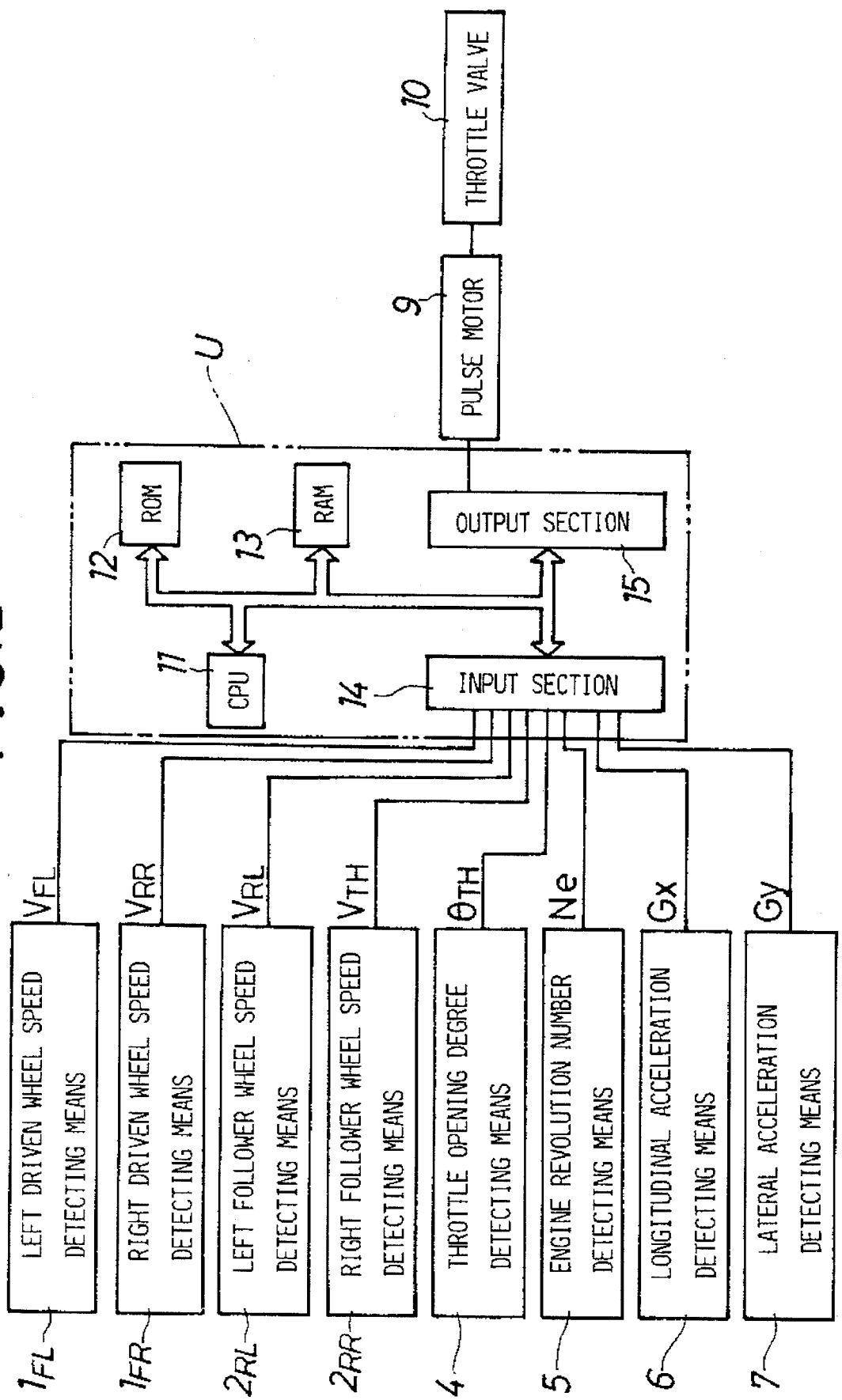
FIG. 2 is a block diagram of the traction control system.

FIG. 2 illustrates the electronic control unit U for controlling the output torque from the engine E by calculating signals from the various detecting means on the basis of a controlling program to drive the throttle valve 10 by the pulse motor 9 in order to inhibit the excessive slipping of the driven wheels $W_{FL}$ and $W_{FR}$. The electronic control unit U is comprised of a central processing unit (CPU) 11 for performing such calculation; a read only memory (ROM) 12 having the above-described controlling program and various data such as tables stored therein; a random access memory (RAM) 13 for temporarily storing output signals from the various detecting means and the calculation results; an input section 14; and an output section 15 to which the pulse motor 9 is connected. The above described various detecting means, i.e., the driven-wheel speed detecting means $1_{FL}$ and $1_{FR}$, the follower wheel speed detecting means $2_{RL}$ and $2_{RR}$, the throttle opening degree detecting means 4, the engine revolution speed detecting means 5, the longitudinal acceleration detecting means 6 and the lateral acceleration detecting means 7 are connected to the input section 14. The electronic control unit U calculates the various signals received thereinto from the input section 14, the data stored in the read only memory 12 and the like on the basis of the controlling program which will be described hereinafter, and finally drives the pulse motor 9 through the output section 15. This causes the throttle valve 10 to be controlled to vary the output torque from the engine E, and as a result, the torque of the driven wheels $W_{FL}$ and $W_{FR}$ is controlled to an optimal value to inhibit the excessive slipping of the driven wheels $W_{FL}$ and $W_{FR}$.

Figure 3:
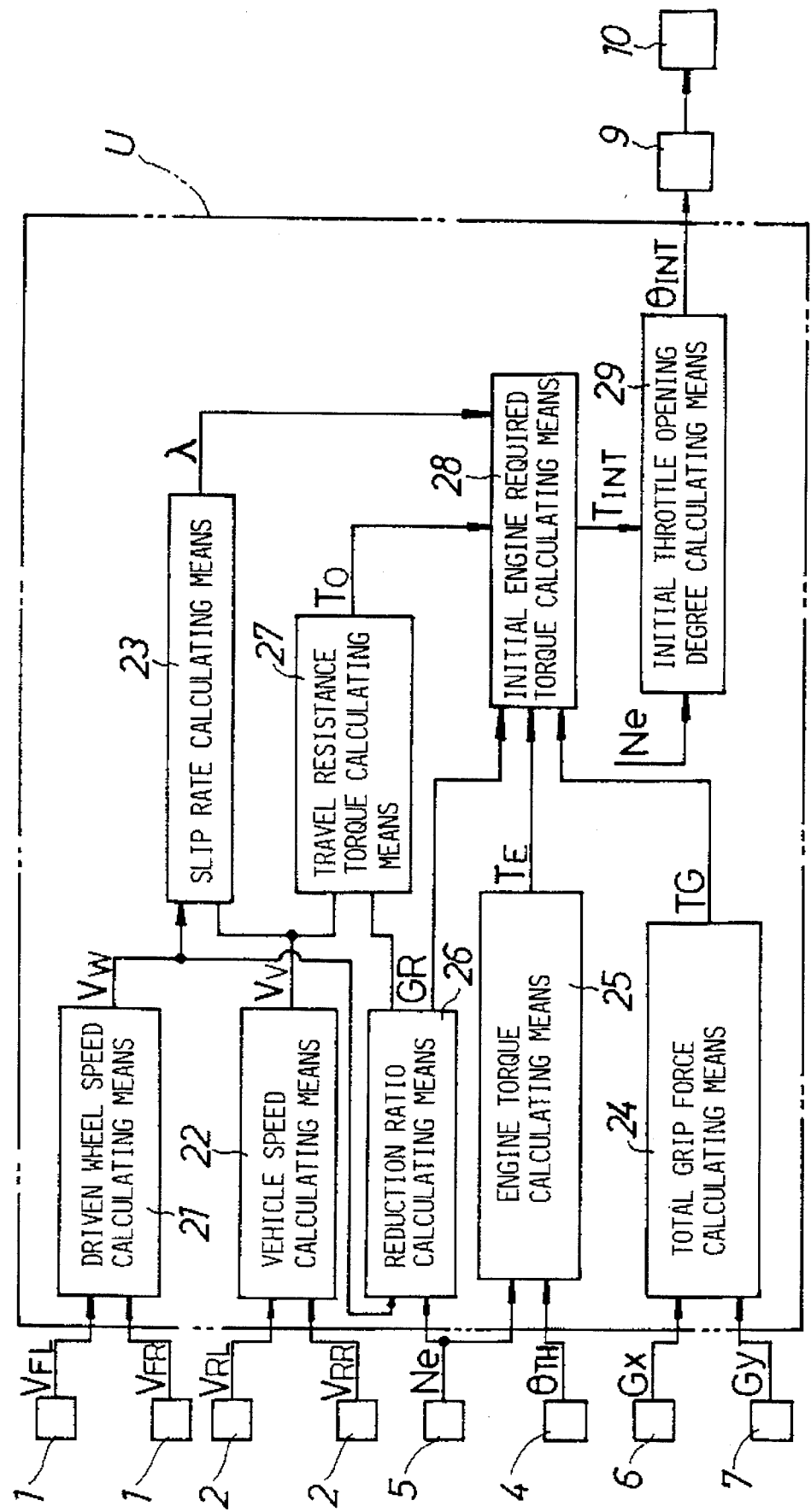
FIG. 3 is a block diagram illustrating the circuit arrangement of an electronic control unit.

The circuit arrangement of the electronic control unit U will be described below with reference to FIG. 3.

The left and right driven wheel speeds $V_{FL}$ and $V_{FR}$ detected by the left and right driven-wheel speed detecting means $1_{FL}$ and $1_{FR}$ are received into a driven wheel speed calculating means 21, where a driven wheel speed $V_W$ is determined by calculating an average value $(V_{FL}+V_{FR})/2$ of the driven wheel speeds $V_{FL}$ and $V_{FR}$. The left and right follower wheel speeds $V_{RL}$ and $V_{RR}$ detected by the left and right follower wheel speed detecting means $2_{RL}$ and $2_{RR}$ are received into a vehicle speed calculating means 22, where a vehicle speed $V_V$ is determined by calculating an average value $(V_{RL}+V_{RR})/2$ of the follower wheel speeds $V_{RL}$ and $V_{RR}$. The driven wheel speed $V_W$ determined in the driven wheel speed calculating means 21 and the vehicle speed $V_V$ determined in the vehicle speed calculating means 22 are received into a slip rate calculating means 23, where a slip rate $\lambda$ of the driven wheels $W_{FL}$ and $W_{FR}$ is determined according to the following expression:

$$\lambda=(V_W-V_V)/V_W\times 100$$

The longitudinal acceleration Gx of the vehicle body detected by the longitudinal acceleration detecting means 6 and the lateral acceleration Gy of the vehicle body detected by the lateral acceleration detecting means 7 are received into a total grip force calculating means 24, where a total grip force TG corresponding to the acceleration of the vehicle is determined as a sum of vectors according to the following expression:

$$TG=\{(K_1\times Gx)^2+(K_2\times Gy)^2\}^{1/2}$$

wherein each of $K_1$ and $K_2$ is a correction constant.

It should be noted that the longitudinal acceleration Gx of the vehicle body may be determined in the longitudinal acceleration detecting means 6 on the basis of a time-differentiation value of the vehicle speed $V_V$, and the lateral acceleration Gy of the vehicle body may be determined in the lateral acceleration detecting means 7 on the basis of a yaw rate detected by a yaw rate detecting means.

Figure 4:
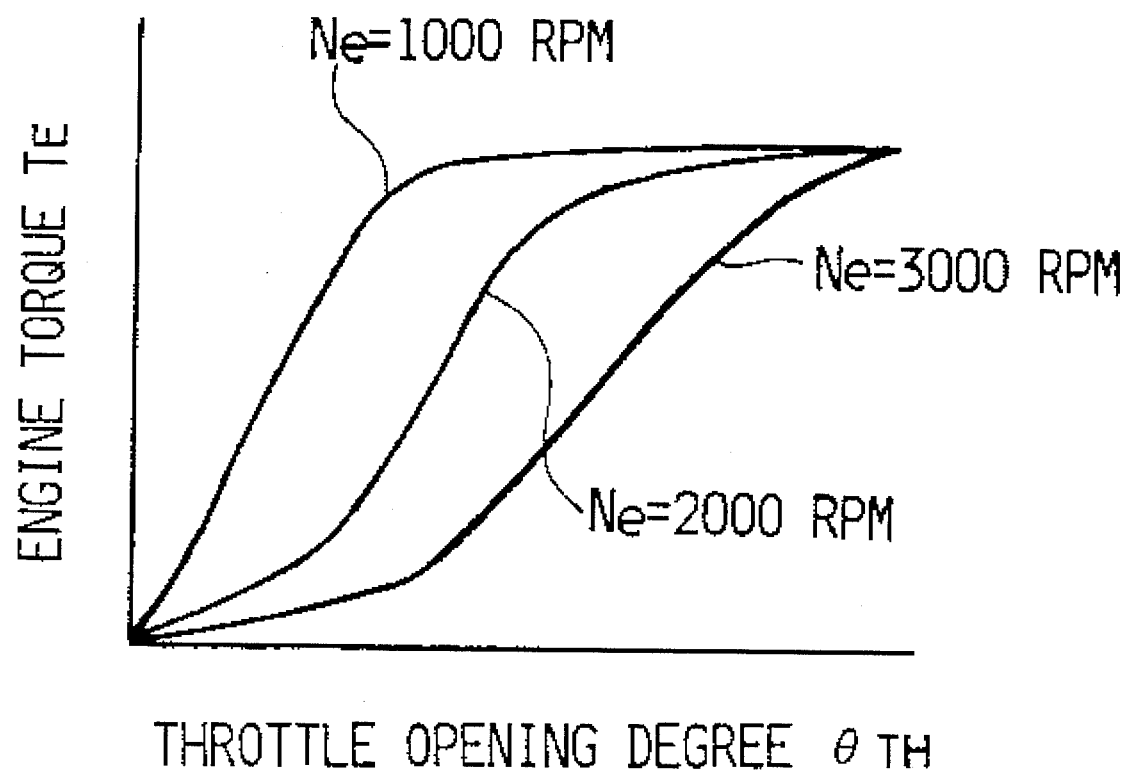
FIG. 4 is a graph illustrating the relationship between the throttle opening degree $\theta_{TH}$ and the engine torque $T_E$.

The throttle opening degree $\theta_{TH}$ detected by the throttle opening degree detecting means 4 and the number Ne of revolution of engine detected by the engine revolution number detecting means 5 are received into an engine torque calculating means 25, where an engine torque $T_E$ currently delivered from the engine E is determined on the basis of a characteristic shown in a graph in FIG. 4, The driven wheel speed $V_W$ determined in the driven wheel speed calculating means 21 and the number Ne of revolution of engine detected by the engine revolution number detecting means 5 are received into a reduction ratio calculating means 26, where a reduction ratio GR in a transmission is determined. It should be noted that in a vehicle including an automatic transmission, the reduction ratio GR can be determined on the basis of a gear position signal from a gear-shift control system.

The vehicle speed $V_V$ determined in the vehicle speed calculating means 22 and the reduction ratio GR determined in the reduction ratio calculating means 26 are received into a travel resistance torque calculating means 27, where a travel resistance torque $T_D$ comprised of a tire-rolling resistance and a vehicle body air resistance is determined according to the following expression:

$$T_D=(K_3+K_4\times V_V^2)\times GR$$

wherein each of $K_3$ and $K_4$ is a correction constant.

Then, the slip rate $\lambda$ determined in the slip rate calculating means 23, the total grip force TG determined in the total grip force calculating means 24, the engine torque $T_E$ determined in the engine torque calculating means 25, the reduction ratio GR determined in the reduction ratio calculating means 26 and the travel resistance torque $T_D$ determined in the travel resistance torque calculating means 27 are received into an initial engine required torque calculating means 28. An initial engine required torque $T_{INT}$ is determined in the initial engine required torque calculating means 28 for use when reducing the output torque from the engine E.

More specifically, a value obtained by subjecting the engine torque $T_E$ determined in the engine torque calculating means 25 to a primary retarded filtering is calculated as a first initial engine required torque $T_{EF}$ ($=T_{INT}$) according to the following expression:

$$T_{EF} = (1-K) \times T_{EF(1-k)} + K \times T_{E(K)}$$

A second initial engine required torque $T_{ED}(=T_{INT})$ is calculated by searching a basic initial required torque $T_{ij}$ from the gear position Gi (i=1, 2, - - - ) of the transmission corresponding to the reduction ratio GR and the total grip force TGj (j=1, 2, - - - ) on the basis of a map shown in FIG. 5, and adding such basic initial required torque $T_{ij}$ and the travel resistance torque $T_D$.

$$T_{ED} = T_{ij} + T_D$$

This second initial engine required torque $T_{ED}$ is a sum of the basic initial required torque $T_{ij}$ which is a torque transmitted to a road surface without consumption in the excessive slipping of the driven wheels $W_{FL}$ and $W_{FR}$, and the travel resistance torque $T_D$ comprised of the tire rolling resistance and the vehicle body air resistance. Therefore, the second initial engine required torque $T_{ED}$ corresponds to a value resulting from subtraction of an invalid torque consumed in the excessive slipping of the driven wheels $W_{FL}$ and $W_{FR}$ from the current engine torque $T_E$.

If the slip rate $\lambda$ determined in the slip rate calculating means 23 exceeds a predetermined threshold value, either one of the first and second initial engine required torques $T_{EF}$ and $T_{ED}$ is selected.

Figure 7:
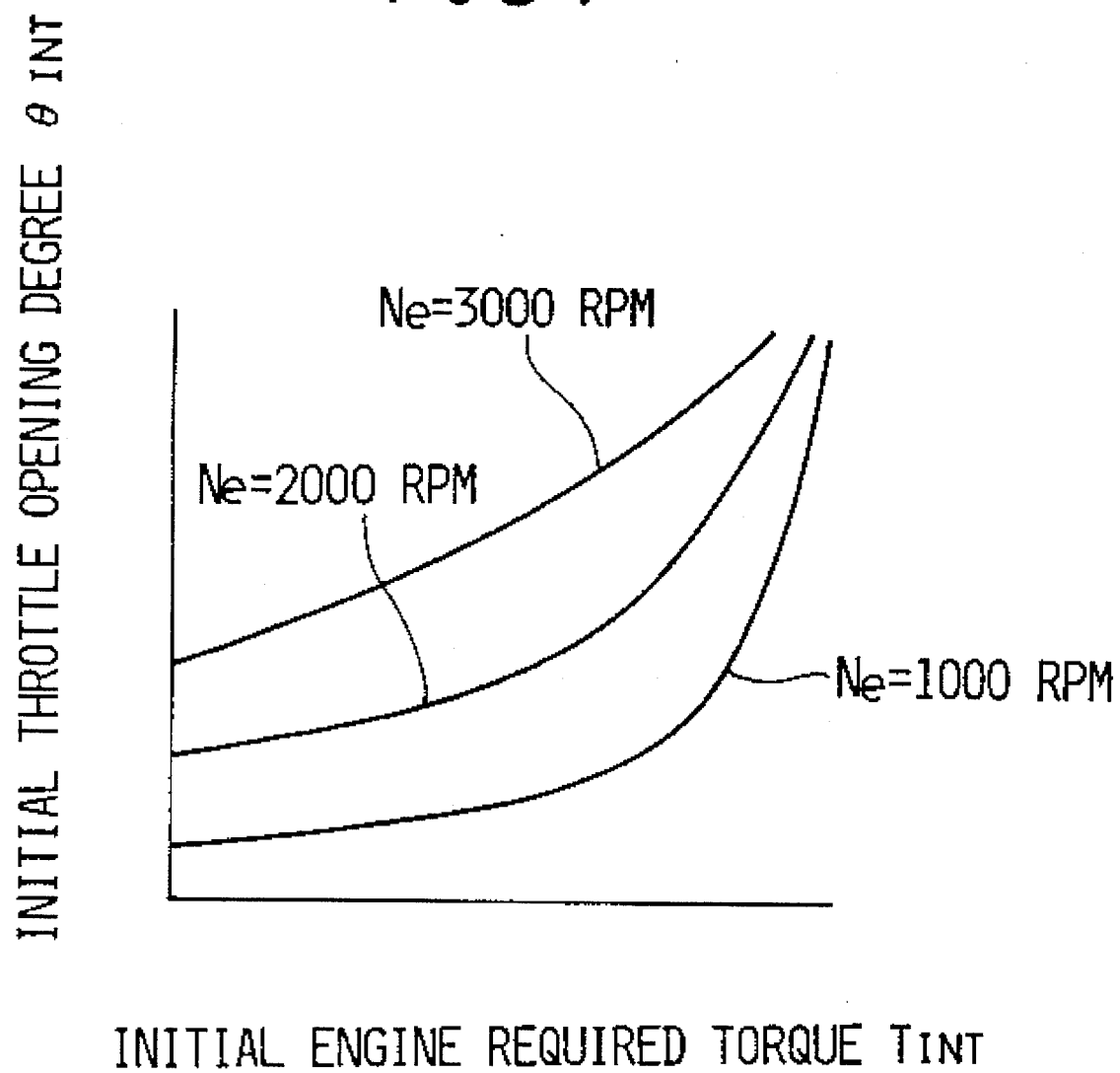
FIG. 7 is a graph illustrating the relationship between the initial engine required torque $T_{INT}$ and the initial throttle opening degree $\theta_{IN\ T}$.

Then, an initial throttle opening degree $\theta$ of the throttle valve 10 is determined an initial throttle opening degree calculating means 29 in so that the engine E outputs the initial engine required torque $T_{INT}$ when the feed-back control of the throttle valve 10 is started. The initial throttle opening degree $\theta_{INT}$ is determined from the initial engine required torque $T_{INT}$ and the number Ne of revolution of engine on the basis of a characteristic shown in a graph in FIG. 7.

The output torque from the engine E is reduced to prevent the excessive slipping of the driven wheels $W_{FL}$ and $W_{FR}$ by performing a PID feed-back control of the pulse motor 9 by the electronic control unit U to adjust the opening degree of the throttle valve 10.

Figure 6:
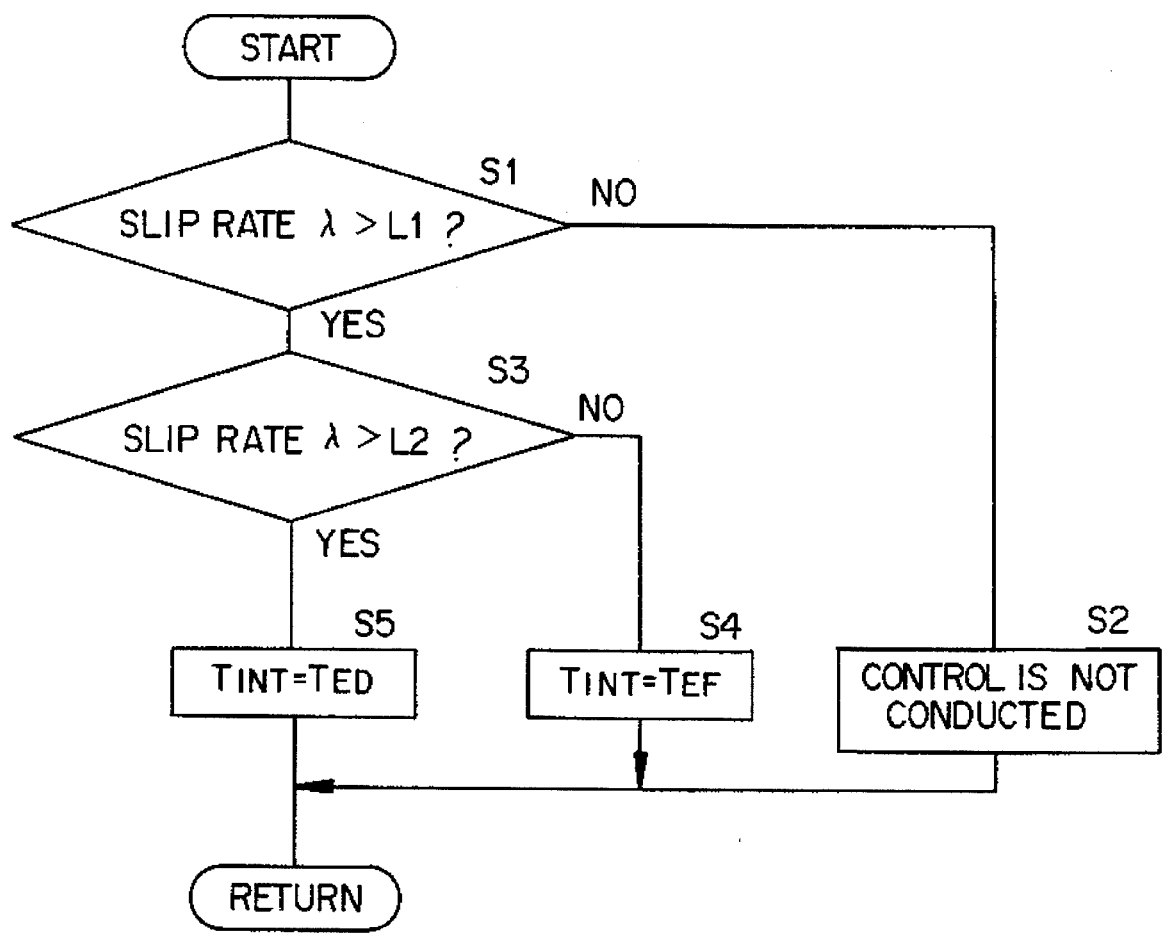
FIG. 6 is a flow chart for an operation carried out in an initial engine required torque calculating means.

The operation in the initial engine required torque calculating means 28 will be described below with reference to a flow chart shown in FIG. 6.

If the slip rate $\lambda$ of the driven wheels $W_{FL}$ and $W_{FR}$ is equal to or less than a first threshold value $L_1$ at a step S1, i.e., when the slip rate $\lambda$ is extremely small and the output torque from the engine E is being sufficiently transmitted to a road surface, the control for reducing the output from the engine E is not conducted at a step 2.

If the slip rate $\lambda$ exceeds the first threshold value $L_1$ at the step S1 and is equal to or less than a second threshold value $L_2$ larger than the first threshold value $L_1$ at a step 83, i.e., in a region in which the slip rate $\lambda$ is relatively small, the first initial engine required torque $T_{EF}$ determined by filtering the engine torque $T_E$ is selected as the initial engine required torque $T_{INT}$ at a step S4. By starting the feed-back control of the throttle valve 10 with the current engine torque $T_E$ used as the initial torque in this manner, the sudden change in engine torque $T_E$ can be prevented to avoid an influence on the behaviour of the vehicle. Moreover, by using the first initial engine required torque $T_{EF}$ resulting from the filtering of the engine torque $T_E$, it is possible to compensate for the time lag until the engine torque $T_E$ converges to a desired value, thereby providing an improved responsiveness.

If the slip rate $\lambda$ exceeds the second threshold value $L_2$ at the step S3, i.e., if the slip rate $\lambda$ is large, the second initial engine required torque $T_{ED}$ which is the sum of the basic initial required torque $T_{ij}$ and the travel resistance torque $T_D$ is selected as the initial engine required torque $T_{INT}$ at a step S5. As a result, the feed-back control of the throttle valve 10 is started from the maximum initial torque capable of increasing the speed of the vehicle without generation of the excessive slipping of the driven wheels $W_{FL}$ and $W_{FR}$, so that the excessive slipping can be promptly reduced without a large influence exerted to the behaviour of the vehicle.

Although the embodiment of the present invention has been described in detail, it will be understood that the present invention is not intended to be limited to this embodiment, and various minor modifications in design can be made without departing from the spirit and scope of the present invention defined in claims.

For example, although the front wheel drive vehicle having the front wheels as the driven wheels and the rear wheels as the follower wheels has been described in the embodiment, the present invention is also applicable to a rear wheel drive vehicle having front wheels as follower wheels and rear wheels as driven wheels.

What is claimed is:

1. A traction control system for a vehicle, comprising:
    driven wheel speed calculating means for calculating a speed of a driven wheel of the vehicle;
    a vehicle speed calculating means for calculating a vehicle speed of the vehicle;
    a slip rate calculating means for calculating a slip rate of the driven wheel on the basis of said driven wheel speed and said vehicle speed, such that the feed-back control of a throttle valve is carried out to reduce the output torque from an engine to inhibit an excessive slipping of the driven wheel, when said slip rate exceeds a predetermined threshold value;
    a total grip force calculating means for calculating a total grip force of the vehicle, wherein said total grip force calculating means calculates said total grip force on the basis of a longitudinal acceleration of the vehicle detected by a longitudinal acceleration detecting means and a lateral acceleration of the vehicle detected by a lateral acceleration detecting means;
    an initial engine required torque calculating means for calculating an initial engine required torque on the basis of said total grip force and a reduction ratio at the start of the feed-back control of said throttle valve; and
    an initial throttle opening degree calculating means for calculating an initial throttle opening degree of said throttle valve on the basis of said initial engine required torque.

2. A traction control system for a vehicle according to claim 1, wherein the initial engine required torque calculated in said initial engine required torque calculating means includes a travel resistance torque of the vehicle calculated in a travel resistance torque calculating means.

3. A traction control system for a vehicle according to claim 1, wherein an engine torque calculated in an engine torque calculating means is used as said initial engine required torque, when said slip rate is smaller than said predetermined threshold value.

* * * * *